May 29, 1951 J. W. SMITH 2,554,508
CONTROL SIGNAL INDICATING CIRCUIT
Filed Dec. 3, 1948
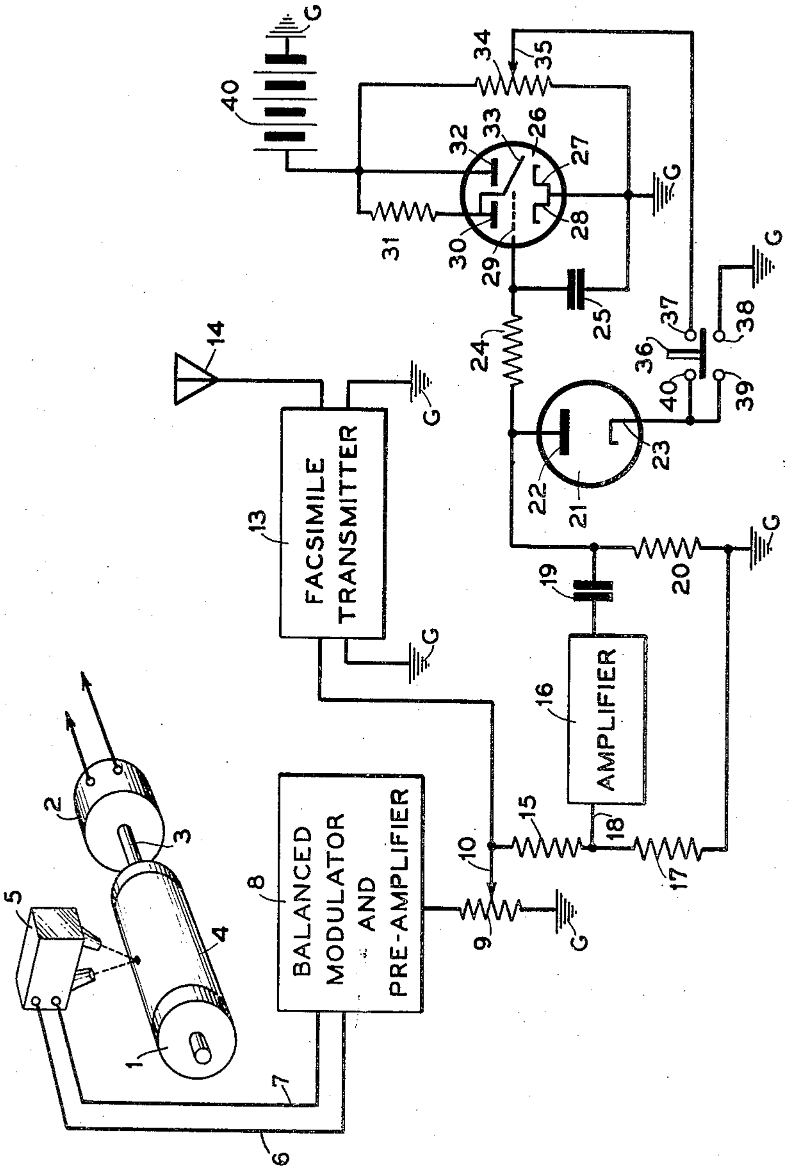
INVENTOR.
JOHN W. SMITH
BY Alfred W. Barber
ATTORNEY Patented May 29, 1951

2,554,508

UNITED STATES PATENT OFFICE 2,554,508

CONTROL SIGNAL INDICATING CIRCUIT

John W. Smith, Whitestone, N. Y., assignor to Faximile, Inc., New York, N. Y., a corporation of Delaware Application December 3, 1948, Serial No. 63,314

3 Claims. (Cl. 332—39)

The present invention concerns facsimile systems and, in particular, facsimile transmitter level control indicating systems.

In a facsimile system, electrical signals are generated representing graphic and textual materials to be reproduced. The amplitude of the signals represents the variations in density of the subject copy from minimum to maximum. There may be considerable variations in the amplitude of the signals due to great differences in density range of the subject copy. Copy with a gray or darkened background, for instance, may have a much smaller density range than sharp black copy against a pure white background. Many systems pick up the light variations from the subject copy in the scanning process in a photoelectric cell and utilize the initial signals generated in the photoelectric cell to modulate a subcarrier in a balanced modulator. One end of the density scale, as represented by the electrical signals, may be set by the point at which the balanced condition is obtained in the balanced modulator. This balance may be obtained for either maximum or minimum density of the subject copy, although, in many ways, it seems desirable to set the balance at the minimum copy density point. This is sometimes called "white" balance. With one end of the density scale determined by the balance point, it is also desirable to define the limits of the excursion of the electrical signals representing the density variations, in order to utilize most efficiently and effectively the characteristics of the facsimile transmission and recording systems. Thus, a simple and accurate method of determining the modulator balance point and the maximum desired density of signal excursion is a desirable feature in a facsimile transmitting system.

The present invention concerns a simple, yet accurate, method and means for indicating the setting of the balance point and the maximum signal excursion in a facsimile transmitting system. The indicating device in the system consists in a novel circuit arrangement for the use of an electron ray indicating tube. With a facsimile scanner set on a portion of the copy at which the balance is to be determined, signals are amplified, rectified and utilized to actuate the electron ray indicating tube. The balance setting of the modulator is then manipulated until no signal is indicated as being received by the electron ray tube and, therefore, balance is obtained in the modulator. By utilizing amplification before the rectifier feeding the electron ray tube, this system may be made as sensitive and accurate as may be required in any given case. In order to set the maximum signal excursion, a variable bias is applied to the rectifier and adjusted to substantially equal the desired maximum signal excursion. Then, the transmitter amplifier gain control is adjusted until the peak of the maximum signal just equals this bias as indicated by its effect on the electron ray tube.

One object of the present invention is to provide a simple method and means for determining the minimum signal and the maximum signal excursions in a facsimile transmission system, or the like.

Another object of the present invention is to provide a simple and accurate device for determining when a small signal voltage exists in a facsimile system or the like.

Still another object of the present invention is to provide a simple and accurate device for determining the maximum signal amplitude in a facsimile system or the like.

A still further object of the present invention is to provide means for utilizing the same indicator for indicating minimum signal in a facsimile system or the like, and, by means of a switch arrangement and adjustable bias, to indicate a predetermined maximum signal excursion.

These and other objects of the present invention will be apparent to those skilled in the art from the detailed description of the invention given in connection with the drawing.

The figure shows a preferred form of the present invention in connection with a facsimile transmitter.

In the drawing a facsimile transmitting drum 1, carrying the subject copy 4 is rotated by a motor 2, through shaft 3. Scanning box 5 generates electrical signals representing the subject copy density variations in any convenient and suitable manner and signals thus generated are applied over leads 6 and 7 to balanced modulator 8. The signals received by balanced modulator 8 are utilized to modulate a suitable subcarrier and are amplified by a preamplifier and set to an output level control consisting of potentiometer 9 connected between balanced modulator 8 and ground G. A portion of the signals appearing across potentiometer 9 are applied to facsimile transmitter 13 in an amount determined by the setting of contact arm 10. The signals reaching transmitter 13 are utilized in any convenient manner to modulate the facsimile transmitter and are radiated from antenna 14 and ground G to be recorded at some distant point.

At least a portion of the signals applied to transmitter 13 are also applied to the indicating device which is the subject of the present invention. These signals are applied to amplifier 16 through series isolating resistor 15 and across shunt resistor 17 by means of lead 18. After suitable amplification, the signals are applied across resistor 20, through coupling capacitor 19. The signals across resistor 20 are applied to diode 21 which includes cathode 23, heated by suitable means not shown, and plate 22. A switch, including movable contact 36 and stationary contacts 38, 39, 37 and 40, is used to switch cathode 23 either to ground G or to contact arm 35 on potentiometer 34. When contact 36 is depressed to short contacts 38—39, cathode 23 is connected to ground G and all signals appearing across resistor 20 are rectified by diode 21 generating a rectified signal which makes plate 22 negative with respect to ground G. The negative bias thus generated is filtered through resistor 24, across capacitor 25 and is applied to control grid 29 of the amplifier section of the electron ray tube 26. Electron ray tube 26, which may be of the type designated as 6E5, includes cathode 28, control grid 29, amplifier plate 30, and, connected to plate 30, control electrode 33, electron ray cathode 27, and electron ray plate 32. Plate 32 is connected to a voltage source such as battery 40 and plate 30 is connected through a load resistor 31 to voltage source 40. Potentiometer 34 is connected between voltage source 40 and ground G so that its contactor 35 may be varied from a point at ground potential up to a point equal to the potential of battery 40. When the rectified signals above described are filtered through resistor 24 and applied to grid 29, they will cause the "eye" of the electron ray tube to close. The amount by which it closes depends upon the amplitude of the received signal. In order to set the balanced modulator 8 accurately at a balance point, scanner pick-up 5 is set to pick up an area on copy 4 which has a density equal to the density at which the balance is made. Thus, if the balance is to be made for white, the normal type of balance condition, a portion of copy 4 which is white is placed under the scanning beam from scanner 5. The balanced modulator balancing control, which may be of any suitable construction, not shown, is then manipulated until the electron eye opens fully, showing that no voltage is being received across resistor 20. The sensitivity and accuracy of this adjustment may be carried to any desired degree by suitable amplification in amplifier 16 and is tremendously increased by the lack of inertia in the "eye" indicator. With the balance point set, the drum 4 is rotated and a point of maximum density placed under the scanning beam so that the maximum signal strength for the copy is generated and appears across potentiometer 9. Contact 36 is moved to its upper position, shorting contact 37—40 and placing a bias on cathode 23, the amount of the bias being determined by the position of contact 35 on potentiometer 34. This bias prevents any current flow in diode 21 until the received signal appearing across resistor 20 has peaks which exceed the bias. From previous calibrations of the system, slider 35 is usually semipermanently adjusted so that the proper value maximum signals appearing across resistor 20 and rectified by diode 21 generate a negative bias on control grid 29 sufficient to cause the electron eye to just close. If the eye does not close, or if it closes so as to overlap, slider 10 on potentiometer 9 is adjusted until the point of just closing is reached. This adjustment, as determined by previous calibrations, is then such that, facsimile transmitter 13 receives exactly the right peak signals during the scanning process of copy 4. If the copy 4 is changed, the process is repeated, that is, the balance in the balanced modulator 8 is reset and the maximum signal level is also reset by readjustment of slider 10 on potentiometer 9. It is readily seen that, by use of the apparatus described in the manner outlined, very accurate settings of balance condition and maximum desired signal strength in the balanced modulator may be easily and quickly obtained. By the use of an electron ray indicating device, the problems of inertia present in the normal meter type circuits are overcome and an inexpensive, but highly sensitive and accurate indicating system is obtained, which will immediately determine the proper signal strength settings for minimum signal condition or full signal condition for any type of copy material being used.

Though only one means of accomplishing the result obtained has been shown, it will be evident to those skilled in the art that other types of circuits may be employed to produce similar results within the invention as defined in the following claims.

What is claimed is:

1. In a device of the class described, the combination of, a source of signals to be monitored, means for amplifying at least a portion of the signals, means for rectifying said amplified signals to provide control signals, an electron ray indicating device, means for applying said control signals to said electron ray device to indicate the presence of signals from said source, a switch for placing a bias on said rectifier to prevent indication of the control signals until said amplified signals reach a predetermined level, and means for adjusting said bias to a predetermined operating point to determine the signal level at which said electron ray tube indicates.

2. In a facsimile transmitter, the combination of, a balanced modulator, an electron ray indicating tube for indicating the balance condition of said balanced modulator, means including a bias source and a switch for converting said electron ray tube to a peak reading indicator for monitoring the maximum signal provided by said balanced modulator.

3. In a device for monitoring the operating conditions of a balanced modulator, the combination of, a source of signals to be monitored including a balanced modulator, an electron ray indicator tube, a circuit connecting said indicator tube to said source of signals, a rectifier connected in shunt with said circuit for rectifying signals from said source of signals and for applying rectified signal voltage to said indicator tube, a source of reference voltage, and a two position switch connecting one side of said rectifier to a substantially neutral reference voltage point in its first position and to said reference voltage source in its second position for accurately determining modulator balance in the first switch position and for monitoring the maximum signal level in the second switch position.

JOHN W. SMITH.

REFERENCES CITED

The following references are of record in the file of this patent:

UNITED STATES PATENTS

| Number | Name | Date |
|---|---|---|
| 2,069,061 | Finch | Jan. 26, 1937 |
| 2,197,341 | Jonker | Apr. 16, 1940 |
| 2,459,293 | Shonnard | Jan. 18, 1949 |

OTHER REFERENCES

Review for January 1937, pages 119—120.

QST for November 1936, pages 23-26.